United States Patent Office

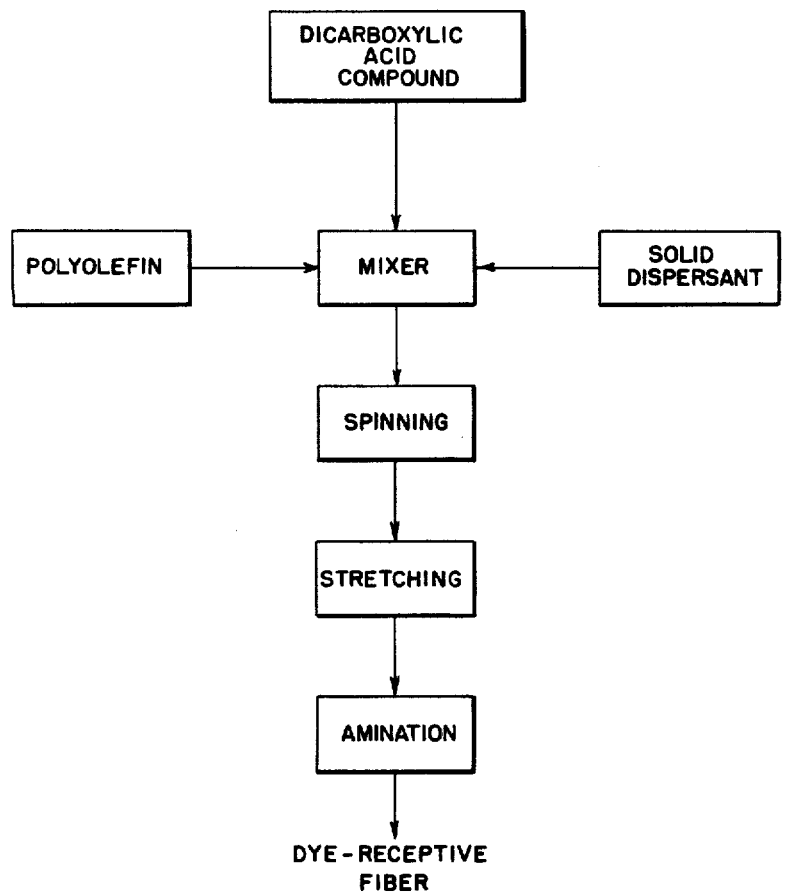

3,112,159
PROCESS FOR PREPARING DYE-RECEPTIVE POLYOLEFIN FIBRES
Vittorio Cappuccio and Ubaldo Riboni, Terni, Italy, assignors to Montecatini, Società Generale per l'Industria Mineraria e Chimica, Milan, Italy, a corporation of Italy
Filed June 7, 1960, Ser. No. 34,385
Claims priority, application Italy June 9, 1959
11 Claims. (Cl. 18—54)

The present invention relates to crystalline polyolefin fibres that are particularly receptive to dyes and to a process for preparing the same.

Various processes for the obtaining of textile fibres from crystalline polyolefins, which fibres have a particular receptivity for dyes, have been described. Four typical prior processes may be summarized as follows:

(1) Preparation of fibres from mixtures: Polyolefins are mixed with other resins (e.g., epoxy resins, polyamides, polyimines, polyesters and the like) capable of rendering the fibres dyeable, and the mixtures thus obtained are spun according to the normal spinning techniques. When an epoxy resin is used as a component of the mixture, a subsequent treatment of the resulting fibres with a basic substance is provided for.

(2) Grafting of reactive monomers onto the fibres: The polyolefin fibres are treated with reactive monomers in the presence of agents which catalyze the polymerization of the monomers. These are thus bound onto the fibres by means of graft polymerization. Typical reactive monomers include vinyl monomers such as acrylonitrile, styrene, vinyl esters, nitrogen-containing monomers such as vinylpyridines, isopropenylpyridines, etc., and acid monomers.

(3) Mixing of polyolefins with various monomers in the spinning stage: Polyolefins are mixed with vinyl monomers, acid monomers, or the like before spinning, and the mixes are then subjected to the usual technological operations for preparing textile fibres.

(4) Chemical treatments on the fibres: Polyolefin fibres are subjected to sulfonation and the sulfonated fibres are treated with amines.

It is an object of this invention to provide a novel method for rendering crystalline polyolefins dye-receptive.

Another object is to provide a method of treating crystalline polyolefins whereby their affinity for acid dyes is markedly increased.

Additional objects will become apparent hereinafter.

We have now found that textile fibres from a crystalline polyolefin and having unusual receptivity for dyes, and particularly for acid dyes, can be obtained by mixing the polyolefin with a dicarboxylic acid or derivative thereof. The dicarboxylic acid may be aliphatic, aromatic, or alicyclic, and may be either saturated or unsaturated. The mixture is then spun and, in accordance with another aspect of our invention, may be subjected to the action of an amino or imino compound. However, non-aminated fibres are dyeable with either dispersed acetate dyes or basic dyes.

Particularly suitable dicarboxylic acids and/or acid anhydrides include succinic acid, sebacic acid, adipic acid, azelaic acid, glutaric acid, pimelic acid, suberic acid, nonanedicarboxylic acid, decanedicarboxylic acid, fumaric acid, maleic acid (and maleic anhydride) and phthalic acid (and anhydride).

In addition to the dicarboxylic compound a small amount of a "solid dispersant" can be mixed with the polyolefin, as described in Italian patent application No. 8,529/60 filed on February 15, 1960. Such dispersants include cetyl and stearic alcohols; stearic and terephthalic acids; benzoin; furoin; vinyl stearate; mono-, di- and tri-stearic esters of glycerol; mono-ethanolamine stearate; stearic acid amide; N-diethanol-lauramide; $C_6C_{30}$ aliphatic amines; condensation products of ethylene oxide with alcohols, amines and phenols; polyacrylonitrile; polystyrene; styrene copolymers; terpene polymers; etc.

The dicarboxylic compounds may be added to the polyolefin in an amount from about 1 to 25% by weight of the mixture. The solid dispersant should be present in an amount from about 0.1 to 5% by weight of the mixture.

The amination of the fibres (now consisting of polyolefin-dicarboxylic compound mixture) is preferably carried out by treating the fibres with an anhydrous amine or imine, or with a boiling (generally aqueous) solution of the amine or imine for a time varying from a few seconds to two to three hours, depending on the reactivity of the amine or imine used.

Typical amines and imines that are suitable include ethylene diamine, propylene diamine, hexamethylene diamine, triethylene diamine, diethylene triamine, tetraethylene pentamine, ethylene imine, polyethylene imine, 3-diethylamino-N-propylamine, tetramethylene diamine, and cyclohexylamine.

The spinning of the polyolefin-dicarboxylic acid composition is carried out more easily than the spinning of the polyolefin alone. The presence of the dicarboxylic compound occasionally makes it possible to carry out the extrusion at lower temperatures.

The attached FIGURE shows a schematic representation of the process of the present invention.

The following examples will further illustrate our invention; the polyolefins referred to in same examples are preferably those prepared with Natta's catalysts as described, for example, in Italian Patent 526,101 and U.S. Patent No. 3,014,016.

As is known to the art subsequent to the discoveries of Natta et al., and as will be noted from the following examples, the heptane residue indicates the presence of isotactic polypropylene macromolecules. Thus, the crystallinity of the polypropylenes of the working examples is due to the presence of isotactic macromolecules.

All parts are by weight unless otherwise stated.

Example 1

A mix is prepared in a Werner mixer from 9 kg. of polypropylene and 1 kg. maleic anhydride at room temperature. The polypropylene is characterized by the following: intrinsic viscosity $[\eta]$ 1.4 (determined in tetrahydronaphthalene at 135° C.); residue after heptane extraction 97%; ash content 0.055%.

The mix is spun in a melt spinning device at a spinning head temperature of 230° C. The fibres are stretched with a ratio of 1:5 at 120° C., are cut, and the staple is aminated by treatment with a boiling 4.5% aqueous ethyleneimine solution for 30 minutes, with a fibre/bath ratio (by weight) of 1:15. The staple is then washed and dried.

On these fibres intense and solid shades are obtained with the following four dyes of the acid type: solid yellow 2G, wool red B, alizarine blue ACF, and acid black IVS.

Example 2

A mix is prepared in a Werner apparatus at room temperature from 9 kg. polypropylene, 0.8 kg. maleic anhydride, and 0.2 kg. stearic acid dispersant, which facilitates dispersion of the maleic anhydride in the molten mass. The polypropylene used exhibits the following characteristics: intrinsic viscosity $[\eta]$ 1.4; residue after heptane extraction 97%; ash content 0.55%.

The mix is spun in a melt spinning device at a spinning head temperature of 225° C. The fibres are stretched with a ratio of 1:5.3 at 120° C. and are cut. These fibres are dyeable with dispersed acetate dyes and/or with basic dyes.

By subjecting the staple to amination as in Example 1, fibres are obtained on which intense solid shades are produced with the following four dyes: solid yellow 2G; novamine red B, alizarine blue ACF, and acid black IVS.

Example 3

A mix is prepared in a ball mill from 94.5 g. polypropylene, 1.5 g. adipic acid, and 4 g. maleic anhydride. The polypropylene exhibits the following characteristics: [η] 0.96, residue after heptane extraction 94%, ash content 0.21%. This mix is spun in a laboratory melt spinning device at 215° C. The fibres are stretched with a ratio of 1:6.5 at 130° C., are aminated by treatment with a boiling 20% aqueous tetraethylene pentamine solution for 60 minutes with a fibre/bath ratio of 1:10, are washed with water, and are then dried.

On these fibres intense solid shades are produced with the following four dyes: solid yellow 2G, wool red B, alizarine blue ACF, and acid black IVS.

Example 4

A mix is prepared in a ball mill from 90 g. polypropylene and 10 g. of phthalic anhydride. The polypropylene exhibits the following characteristics: [η] 0.96, residue after heptane extraction 94%, ash content 0.21%. This mix is spun in a laboratory melt spinning device at 210° C. The fibres are stretched with a ratio of 1:7 at 130° C. Intense solid shades are obtained by dyeing with the following dispersed acetate dyes and basic dyes: Setacyl yellow 3G, Cibacet scarlet BR, Acetoquinone blue RHO, crystals malachite green, basic fuchsine, and Astrazon blue.

Example 4A

After amination of undyed fibres prepared as described in Example 4, this amination being carried out as described in Example 1, solid intense shades are obtained on these fibres with the following four acid dyes: solid yellow 2G, wool red B, alizarine blue ACF, and acid black IVS.

Example 5

A mix is prepared in a ball mill from 90 g. polypropylene and 10 g. sebacic acid. The polypropylene exhibits the following characteristics: [η] 0.96, residue after heptane extraction 94%, ash content 0.21%. This mix is spun in a laboratory melt spinning device at 210° C. The fibres are stretched with a ratio of 1:5 at 130° C. They are then aminated by treatment with a 50% aqueous tetramethylene diamine solution for 2 hours with a fibre/bath ratio of 1:10. They are then washed and dried. Intense solid shades are produced on these fibres with the following four acid dyes: solid yellow 2G, wool red B, alizarine blue ACF, and acid black IVS.

Variations can, of course, be made without departing from the spirit of our invention.

Having thus described our invention, what we desire to secure and claim by Letters Patent is:

1. A method for rendering polyolefins receptive to dyes, this method comprising melt-mixing said polyolefin with a dicarboxylic acid type compound selected from the group consisting of dicarboxylic acids and dicarboxylic acid anhydrides and extruding the mixture to form fibres.

2. The method of claim 1, wherein the polyolefin is polypropylene consisting prevailingly of isotactic macromolecules.

3. The method of claim 1, wherein the mixture comprises from about 75 to 99% of polyolefin and from about 25 to 1% of dicarboxylic acid type compound.

4. The method of claim 1, wherein the dicarboxylic compound is selected from the group consisting of succinic acid, sebacic acid, adipic acid, azelaic acid, glutaric acid, pimelic acid, suberic acid, nonanedicarboxylic acid, decanedicarboxylic acid, fumaric acid, maleic acid, phthalic acid, maleic anhydride, phthalic anhydride, and mixtures thereof.

5. The method of claim 1, wherein there is added to the mixture a small proportion of a solid dispersant for the dicarboxylic compound.

6. The method of claim 1, wherein the fibres are subjected to a hot amination treatment.

7. The method of claim 6, wherein an amine is used for the hot amination.

8. The method of claim 6, wherein an imine is used for the hot amination.

9. The method of claim 7, wherein the amine is selected from the group consisting of ethylene amine, propylenediamine, hexamethylene diamine, trimethylene diamine, diethylene triamine, tetraethylene pentamine, 3-diethylamino-N-propylamine, tetramethylene diamine, and cyclhexylamine.

10. The method of claim 7, wherein the imine is selected from the group consisting of ethyleneimine and polyethyleneimine.

11. The method of claim 1, wherein the extruded fibres are hot-stretched with a ratio between 1:2 and 1:10, at a temperature of from about 80° to 150° C.

References Cited in the file of this patent

UNITED STATES PATENTS

| | | |
|---|---|---|
| 2,142,007 | Schlack | Dec. 27, 1938 |
| 2,219,700 | Perrin et al. | Oct. 29, 1940 |
| 2,306,880 | Heymann | Dec. 29, 1942 |
| 2,327,705 | Frolich | Aug. 24, 1943 |
| 2,362,375 | Heymann | Nov. 7, 1944 |
| 2,394,688 | Heymann | Feb. 12, 1946 |
| 2,646,339 | Ward et al. | July 21, 1953 |
| 2,694,696 | Melamed | Nov. 16, 1954 |
| 2,984,634 | Caldwell et al. | May 16, 1961 |
| 2,993,018 | Steinlin | July 18, 1961 |
| 3,011,860 | Hirshfeld et al. | Dec. 5, 1961 |
| 3,013,998 | Bottaglioli | Dec. 19, 1961 |

FOREIGN PATENTS

| | | |
|---|---|---|
| 218,673 | Australia | Nov. 10, 1958 |

OTHER REFERENCES

Gamble et al.: Amer. Dyestuff Reported April 14, 1952, pp. P223–227, particularly p. P225.

Datyner: Man-Made Textiles, May 1946, Dyeing and Finishing Sec., pp. 63–65.

UNITED STATES PATENT OFFICE
CERTIFICATE OF CORRECTION

Patent No. 3,112,159                  November 26, 1963

Vittorio Cappuccio et al.

It is hereby certified that error appears in the above numbered patent requiring correction and that the said Letters Patent should read as corrected below.

Column 2, line 71, for "0.55%" read -- 0.055% --; column 4, line 31, for "cyclhexylamine" read -- cyclohexylamine --.

Signed and sealed this 28th day of April 1964.

(SEAL)
Attest:

ERNEST W. SWIDER                  EDWARD J. BRENNER
Attesting Officer                  Commissioner of Patents